United States Patent [19]

Sugiura et al.

[11] 4,114,740
[45] Sep. 19, 1978

[54] DEVICE FOR PREVENTING VIBRATION OF A PRESSURE PLATE OF A FRICTION CLUTCH OF A VEHICLE

[75] Inventors: Teruo Sugiura, Toyota; Hiromitsu Tsubouchi, Nagoya; Nobuyasu Ishida, Tokai; Kiyonori Kobayashi, Toyota, all of Japan

[73] Assignee: Aisin Seiki Kabushiki Kaisha, Japan

[21] Appl. No.: 789,926

[22] Filed: Apr. 22, 1977

[30] Foreign Application Priority Data

Apr. 23, 1976 [JP] Japan .................. 51/46998

[51] Int. Cl.² ............................................ F16D 13/56
[52] U.S. Cl. .......................... 192/70.18; 192/70.28; 192/89 B
[58] Field of Search ............... 192/70.18, 70.28, 89 B, 192/30 V; 188/72.3, 216

[56] References Cited

U.S. PATENT DOCUMENTS

| 2,229,319 | 1/1941 | Wesselhoff | 192/70.28 X |
| 3,554,342 | 1/1971 | Spokas | 192/70.28 X |
| 3,557,923 | 1/1971 | Nickell | 192/70.28 X |
| 3,561,577 | 2/1971 | Binder | 192/70.28 X |

FOREIGN PATENT DOCUMENTS

| 1,027,999 | 4/1958 | Fed. Rep. of Germany | 192/89 B |
| 1,243,763 | 8/1971 | United Kingdom | 192/70.18 |

Primary Examiner—Allan D. Herrmann
Attorney, Agent, or Firm—Oblon, Fisher, Spivak, McClelland & Maier

[57] ABSTRACT

A friction clutch having a flywheel, a pressure plate, an entrainer disc disposed in the space between the flywheel and the pressure plate and splined on an input shaft of a transmission, and a clutch plate spring for engaging the pressure plate, adapted for transmitting torque from the flywheel by resiliently clamping the entrainer disc, and characterized by provision for a resilient, vibration-dampening member which serves to normally urge the pressure plate to be displaced from the flywheel by the stored elastic energy of the resilient member.

7 Claims, 4 Drawing Figures

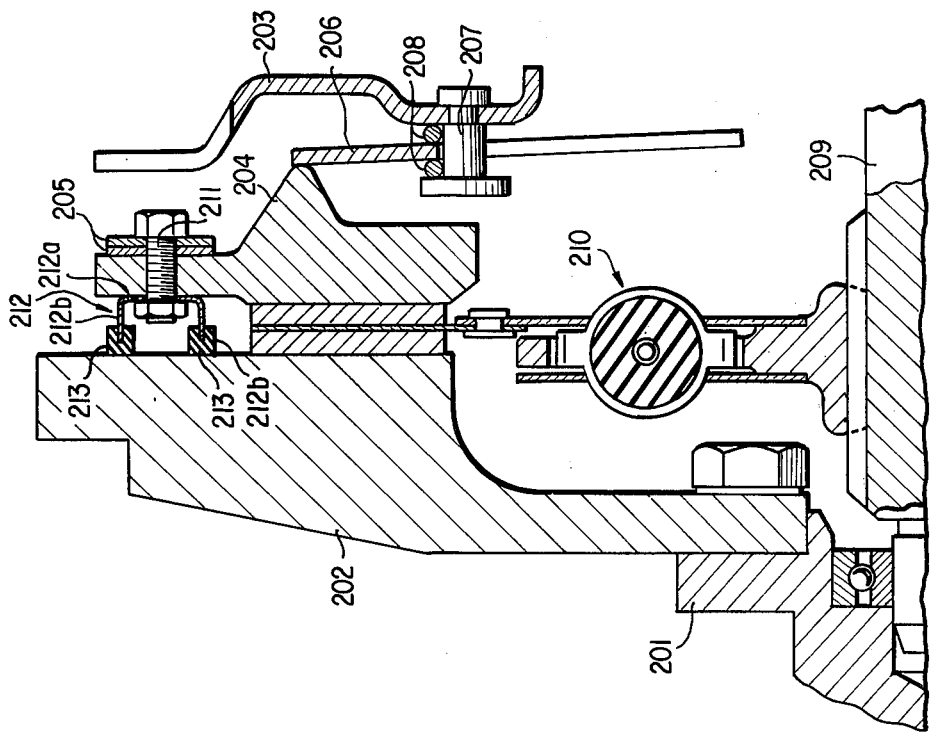
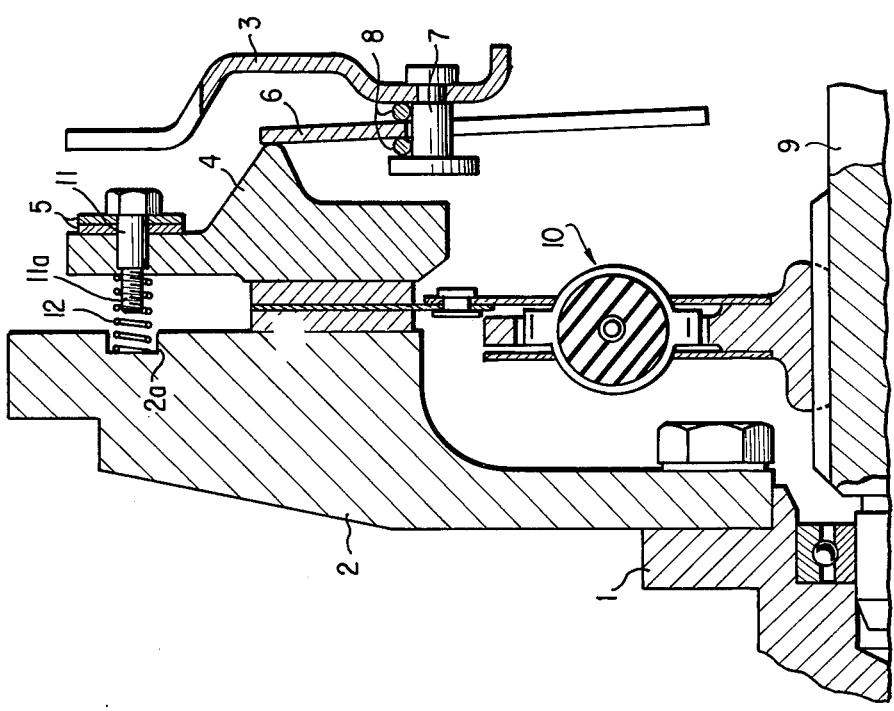

DEVICE FOR PREVENTING VIBRATION OF A PRESSURE PLATE OF A FRICTION CLUTCH OF A VEHICLE

BACKGROUND OF THE INVENTION

1. Field of the Invention

This invention relates to a friction clutch adapted for transmitting torque from the engine flywheel to an input shaft of the transmission of a vehicle by resiliently clamping an entrainer disc or clutch disc on the input shaft between the flywheel and a pressure plate axially displaceable relative to the flywheel but rotatably operable therewith, and more particularly to such clutch having a device for avoiding unacceptable vibration of the pressure plate which is apt to be produced when the clutch is in a disengaged position.

2. Description of the Prior Art

As is well known in the art, the pressure plate, particularly of larger gravity type, is apt to be unacceptably vibrated when the clutch is in the disengaged position, being affected by vibration of the vehicle engine. Possibility of such vibration multiplies as weight or scale of the pressure plate is enlarged suitably for use of, such as for example, a bus or truck. The vibration is considered to be a defect in that the operator's detection of the vehicle operation by his foot being on the clutch pedal is confused due to vibration of the pedal which is induced by the vibration of the pressure plate, and further unacceptable noise is caused by the vibration of the pressure plate.

SUMMARY OF THE INVENTION

An object of this invention is to provide for elimination of vibration of the pressure plate of the friction clutch of a vehicle in the clutch-disengaged position.

According to the present invention, the foregoing and other objects are attained by providing a friction clutch for transmitting torque from a crankshaft to an input shaft of a transmission, which includes a flywheel connected to the crankshaft, a rotatable entrainer disc adjacent to and operatively associated with the flywheel, a cover attached to the flywheel, a pressure plate disposed between the rotatable disc and the cover, a member for securing the pressure plate to the cover whereby the pressure plate is axially displaceable with respect to the cover, a clutch plate spring attached to the cover for axially displacing the pressure plate to engage the entrainer disc during torque transmission and a member for dampening vibration of the pressure plate upon disengagement from the entrainer disc, positioned between the flywheel and the pressure plate.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 1 is an axial sectional view of one embodiment of the invention;

FIG. 4 is an axial sectional view showing still another embodiment of the present invention.

DETAILED DESCRIPTION OF THE PREFERRED EMBODIMENTS

Figure 2:
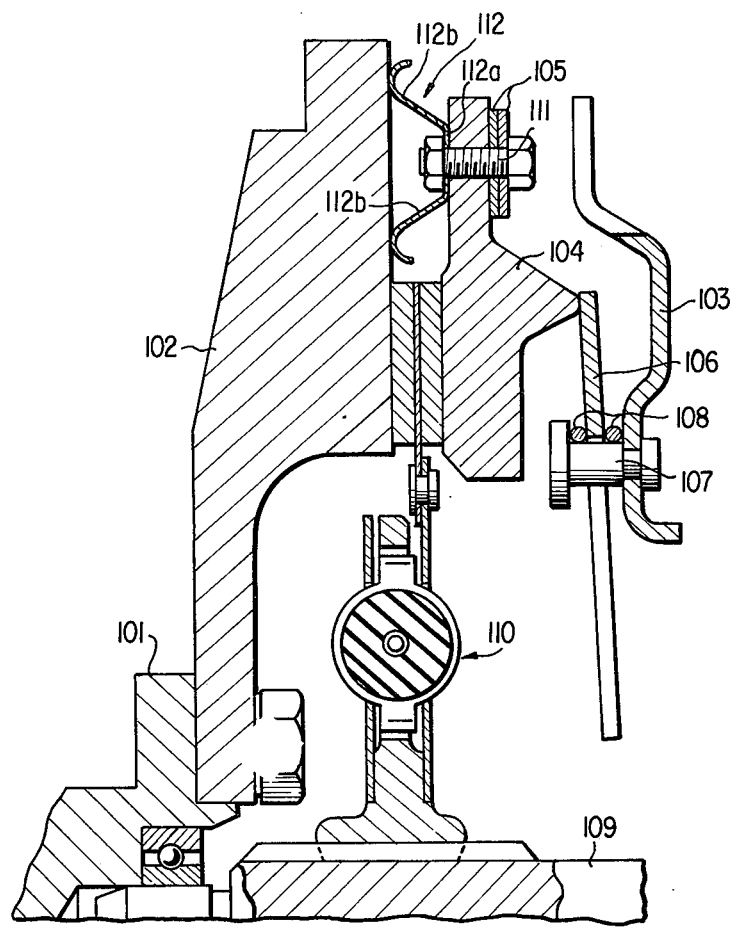
FIG. 2 is an axial sectional view of another embodiment of the invention.

The invention will be described in greater detail hereinafter with reference to FIG. 1. The clutch includes a crankshaft 1, a flywheel 2 secured to the crankshaft, a cover 3 secured by screws (not shown) to flywheel 2, and a pressure plate 4 connected through leaf springs 5 by means of rivets or bolts 11, with first and second end portions extending from opposite sides of pressure plate 4, to cover 3. Pressure plate 4 is axially displaceable by clutch plate spring 6 toward counter pressure disc or flywheel 2 and entrainer disc or clutch disc 10 splined on an input shaft 9 of the transmission mechanism (not shown). Clutch plate spring 6 is located between circular seats 8 which are formed from a curved ring, for example of wire, having a circular cross section, and can either be formed of a close, i.e., end-welded ring, or open at the ends thereof. The left one of seats 8 is held by prestressing between the collars of pins 7 and clutch plate spring 6, and the other seat 8 is held by also prestressing between cover 3 and clutch plate spring 6. A unitary construction rotatable as a unit results from the various members thus far described.

In the position shown in FIG. 1, the clutch is in an engaged position in which the clutch is tightened by clamping clutch disc 10 between flywheel 2 and pressure plate 4, so that torque is transmitted from the flywheel to input shaft 9 of the transmission mechanism. To disengage the clutch, the disengaging or shift ring (not shown), which engages the inner points of the tongues of the plate spring 6, is displaced to the left by a known shift mechanism (also not shown) so that the outer region of clutch plate spring 6 clamped between seats 8 swings toward cover 3.

The clutch according to the invention is characterized through provision of the following arrangement which is useful in preventing vibration of pressure plate 4.

Bolts 11 employed for securing leaf springs 5 to pressure plate 4 extrude to the left from pressure plate 4. The extruding portion 11a of the bolt 11 is of somewhat smaller diameter and of such length that the left extremity thereof is apart from flywheel 2 in the engaged position of the clutch. A compressed coil spring 12 is seated in the face of pressure plate 4 at the right-hand end of the coil-spring and seated at the other end in a corresponding recess 2a in the face of the flywheel 2. The coil spring 12 is diametrically sized such that it closely fits the diametrically smaller portion of bolt 11 for providing better grip or hold. In the engaged condition of the clutch, the coil spring 12 is overcome by the installed load of plate spring 6, although it continues to resist against clutch plate spring 6.

When the clutch is disengaged, the tongues of clutch plate spring 6 are displaced to the left so that the other region of clutch plate spring 6 swings toward cover 3 as described previously. Pressure plate 4 is therefore moved to the right by the stored elastic energy in leaf springs 5 while being kept in contacting and pursuing relationship with the outer region of clutch plate spring 6 so that the clamping function of flywheel 2 and the pressure plate 4 is dissipated and entrainer disc or clutch disc 10 is freed. The clutch is thus disengaged and the transmitting of torque therefore ceases. In this condition, compressed coil spring 12 normally assists leaf springs 5 and urges pressure plate 4 towards the outer region of clutch plate spring 6. It should be noted that two or more coil springs 12 are provided in peripherally spaced relation with each other though only one is shown in FIG. 1 for convenience of illustration. Since an installed load of coil springs 12 affects the vibration character of pressure plate 4 in the disengaged position, a number of such vibrations in a given time does not depend upon an otherwise reliable elastic modulus and spring constant of leaf springs 5. It will be understood therefore that by selecting the installed load, namely an elastic modulus and a spring constant, of the coil springs 12, the vibration character of pressure plate can be altered. It will be further understood that such selection of installed load prevents pressure plate 4 from resonating with engine flywheel 2 in the disengaged position of the clutch. This is effective to limit the vibration of pressure plate 4 in the disengaged position to a lower limit, and accordingly to provide a better sensing of the operator's foot on the clutch pedal, with little unacceptable noise resulting from the vibration.

The connection of coil spring 12 to bolt 11 is not limited to the manner shown. Coil spring 12 may be in screwed connection with bolt 11 by correspondingly threading bolt 11. Coil spring 12 otherwise may be secured to bolt 11 by forming a suitable number of annular grooves at regular intervals on bolt 11 to thereby ensure firm gripping connection of the coil spring 12 with bolt 11 with the stored elastic energy within the spring employed.

Figure 3:
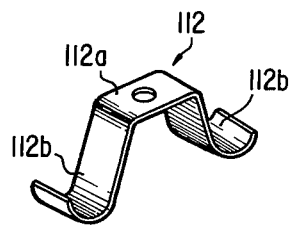
FIG. 3 is a perspective view of a part of the embodiment of FIG. 2.

In FIGS. 2 and 3 there is shown another embodiment of the invention. The clutch of this embodiment includes a crankshaft 101, a flywheel 102 secured to the crankshaft, a cover 103 secured by screws (not shown) to flywheel 102, and a pressure plate 104 connected through leaf springs 105 by means of rivets or bolts 111 to cover 103. Pressure plate 104 is axially displaceable by clutch plate spring 106 toward counter pressure disc or flywheel 102 and entrainer disc or clutch disc 110 splined on an input shaft 109 of the transmission mechanisms (not shown). Clutch plate spring 106 is located between circular seats 108 which are formed from a curved ring, for example of wire, having a circular cross section, and can either be formed of a closed, i.e., end-welded ring, or open at the ends thereof. The left one of seats 108 is held by prestressing between the collars of pins 107 and clutch plate spring 106, and the other seat 8 is held by also prestressing between cover 103 and clutch plate spring 106. A unitary construction rotatable as a unit again results from the various members thus far described.

Bolts 111 sustain leaf springs 105 at their foot portions on one side of pressure plate 104 while connecting at the opposite side of the pressure plate expandedly U-shaped leaf springs 112 with bottom portion 112a clamped between pressure plate 104 and a head of bolts 111. It will be understood readily that two tongues 112b of each spring 112 serves as spring with stored elastic energy exerted to urge pressure plate 104 to the right, regardless of whether the clutch is in engaged or disengaged condition.

It will be understood that by selecting the installed load property of tongues 112b, pressure plate 104 may be altered as to its number of vibrations in a given time in order to prevent plate 104 from resonating with engine flywheel 102.

It is further noted that two tongues 112b beneficially provide additional dampening of the vibration of pressure plate 104 by frictional force at their extremities relative to the face of flywheel 102. The reduction of vibration attained results in a higher rate of success than is attained by the first embodiment.

In FIG. 4 is shown still another embodiment of the invention. In this embodiment, the clutch includes a crank shaft 201, a flywheel 202 secured to the crank shaft, a cover 203 secured by screws (not shown) to flywheel 202, and a pressure plate 204 connected through leaf springs 205 by means of rivets or bolts 211 to cover 203. Pressure plate 204 is axially displaceable by clutch plate spring 206 toward counter pressure disc or flywheel 202 and entrainer disc or clutch disc 210 splined on an input shaft 209 of the transmission mechanisms (not shown). Clutch plate spring 206 is located between circular seats 208 which are formed from a curved ring, for example of wire, having a circular cross section, and can either be formed of a closed, i.e., end-welded ring, or open at the ends thereof. The left one of seats 208 is held by prestressing between the collars of pins 207 and clutch plate spring 206, and the other seat 208 is held by also prestressing between cover 203 and clutch plate spring 206. A unitary construction to rotate as a unit once more results from the various members thus far described.

Bolts 211 sustain leaf springs 205 on the right-hand face of the pressure plate while at the opposite face sustain U-shaped leaf springs 212 with their bottom portions 212a clamped between the heads of bolts 211 and pressure plate 204. At ends 212b of U-shaped spring 212 is fastened elastic members, such as for example, rubber members 213. Rubber members 213 serve in the same manner as that of coil spring 12 of the first embodiment in order to normally urge pressure plate 204 to the right regardless of whether the clutch is in engaged or disengaged position. This also prevents pressure plate 204 from resonating with flywheel 202. A selected or stored elastic energy of rubber members 213 beneficially affects the vibration of pressure plate 204 so as to prevent the pressure plate from resonating with flywheel 202 when the clutch is in disengaged position. Rubber members 213 additionally dampen vibration of pressure plate 204 with their frictional force relative to flywheel 202. The result is that a higher vibration dampening rate of success is attained than that in the first embodiment.

Throughout the several embodiments, it will be understood that the present invention provides an alteration of the vibrational property of the pressure plate in the disengaged position in order to prevent the pressure plate from rattling and resonating with the flywheel. Further, it will be understood that this object is attained according to at least one aspect of the present invention through provision of resilient or elastic members between the flywheel and the pressure plate so as to normally urge the pressure plate toward its disengaged position from the flywheel. Vibration of the pressure plate is therefore limited to a lower level and accordingly better sensing of the driver's foot is provided on the clutch pedal and, moreover, unacceptable noises are also limited to a minimum.

Furthermore, it will be noted that the resilient or elastic member provides additional spring-biasing of the pressure plate toward attachment against the clutch plate spring so that the retracting springs may be substituted with the resilient members. This substitution is effective to reduce the entire gravity of the pressure plate assembly in order to thereby decrease the influence of the resonance of the engine flywheel in the disengaged position.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A friction clutch for transmitting torque from a crankshaft to an input shaft of a transmission, which comprises:
    a flywheel connected to said crankshaft;
    a rotatable entrainer disc, adjacent to and operatively associated with said flywheel for transmitting torque from said flywheel to said input shaft;
    a cover attached to said flywheel;
    a pressure plate disposed between said entrainer disc and said cover;
    means for securing said pressure plate to said cover whereby said pressure plate is axially displaceable with respect to said cover;
    a clutch plate spring attached to said cover for axially displacing said pressure plate to engage said entrainer disc during said torque transmission; and;
    means for dampening vibration of said pressure plate upon disengagement from said entrainer disc, positioned between said flywheel and said pressure plate, and operatively secured to said securing means wherein said securing means comprises a connecting member with first and second end portions extending from a side of said pressure plate adjacent said flywheel and from a side of said pressure plate adjacent said cover, respectively,
    at least one resilient member interconnecting said second connecting member end portion and said cover, and
    wherein said vibration dampening means is connected to said first connecting member end portion.

2. The friction clutch of claim 1, wherein:
said clutch plate spring is disposed between said pressure plate and said cover.

3. The friction clutch of claim 1, wherein:
said clutch plate spring is disposed between said pressure plate and said cover.

4. The friction clutch of claim 1, wherein:
said vibration dampening means comprises a coil spring.

5. The friction clutch of claim 1, wherein:
said vibration dampening means comprises a U-shaped leaf spring.

6. The friction clutch of claim 1, wherein:
said vibration dampening means comprises a U-shaped spring.

7. The friction clutch of claim 6, wherein:
said U-shaped spring further includes a rubber member mounted on end portions of said U-shaped spring.

* * * * *